United States Patent
Keezhuridathil et al.

(10) Patent No.: US 12,197,580 B2
(45) Date of Patent: Jan. 14, 2025

(54) APPARATUS AND METHOD FOR AUTOMATED POLICY MANAGEMENT FOR DEPLOYING APPLICATIONS

(71) Applicants: RAKUTEN MOBILE, INC., Tokyo (JP); Rakuten Symphony, Inc., Tokyo (JP)

(72) Inventors: Unnikrishnan Keezhuridathil, Indore (IN); Devendra Behera, Indore (IN); Ritesh Kumar Kalle, Tokyo (JP)

(73) Assignees: RAKUTEN MOBILE, INC., Tokyo (JP); RAKUTEN SYMPHONY, INC., Tokyo (JP)

(*) Notice: Subject to any disclaimer, the term of this patent is extended or adjusted under 35 U.S.C. 154(b) by 0 days.

(21) Appl. No.: 17/798,743

(22) PCT Filed: Jul. 14, 2022

(86) PCT No.: PCT/US2022/037057
§ 371 (c)(1),
(2) Date: Aug. 10, 2022

(87) PCT Pub. No.: WO2024/015058
PCT Pub. Date: Jan. 18, 2024

(65) Prior Publication Data
US 2024/0193274 A1    Jun. 13, 2024

(51) Int. Cl.
*G06F 21/60* (2013.01)
*G06F 8/60* (2018.01)
*G06F 21/57* (2013.01)

(52) U.S. Cl.
CPC ............. *G06F 21/572* (2013.01); *G06F 8/60* (2013.01); *G06F 2221/033* (2013.01)

(58) Field of Classification Search
None
See application file for complete search history.

(56) References Cited

U.S. PATENT DOCUMENTS

2002/0191014 A1    12/2002    Hsieh et al.
2014/0032758 A1*    1/2014    Barton ............... H04L 41/00
                                                                  709/225
(Continued)

FOREIGN PATENT DOCUMENTS

WO    2022/006472 A1    1/2022

OTHER PUBLICATIONS

International Search Report dated Nov. 18, 2022 issued by the International Searching Authority in Application No. PCT/US 22/37057.
(Continued)

*Primary Examiner* — Fatoumata Traore
(74) *Attorney, Agent, or Firm* — Sughrue Mion, PLLC (57) ABSTRACT

A system and method provide for automated management of policies in an application platform. A plurality of policy groups are established, each according to a set of included policies and a set of assigned application groups, where each policy defines a requirement and an automated response, and each application group is defined according to a rule to determine whether an application is contained within. A configuration file for each policy group associates each assigned application group with each included policy. An automatic configuration, according to the configuration file for each of the policy groups, configures an admission controller of the application platform to selectively test an application contained within an application group and designated for deployment to the application platform, to determine whether it meets the requirement of each policy associated with the application group, and to selectively execute the automated response based on a failure to fulfill the requirement.

9 Claims, 4 Drawing Sheets

(56) References Cited

U.S. PATENT DOCUMENTS

2014/0130036 A1* 5/2014 Gurikar ............... G06F 8/62
   717/176
2015/0312274 A1* 10/2015 Bishop ............... H04L 63/20
   726/1
2017/0180266 A1* 6/2017 Frank ............... H04L 67/51
2017/0288967 A1* 10/2017 Naqvi ............... H04L 41/0893

OTHER PUBLICATIONS

Written Opinion dated Nov. 18, 2022 issued by the International Searching Authority in Application No. PCT/US 22/37057.

* cited by examiner

FIG. 1

APPARATUS AND METHOD FOR AUTOMATED POLICY MANAGEMENT FOR DEPLOYING APPLICATIONS

CROSS REFERENCE TO RELATED APPLICATIONS

This application is a National Stage of International Application No. PCT/US2022/037057 filed Jul. 14, 2022.

BACKGROUND

1. Field

Apparatuses and methods consistent with example embodiments relate to management of policies for enforcement against applications to be deployed on an application platform, and more particularly, to the automated generation of configuration files and corresponding configuration of the application platform to selectively apply the policies against particular groups of applications.

2. Description of Related Art

In cloud native application platforms (such as Kubernetes), an application can be uploaded, onboarded, and deployed onto clusters on the platform. The application can then be accessed and operated by users across a network.

During this process, security policies are preferably enforced or otherwise applied automatically as a safety measure, to ensure neither the platform nor its users could be harmed by installation or use of the application. Other policies may also be applied for reasons other than security. Each policy defines a requirement or constraint against which the application is tested. An application which fails to meet a given policy can have various automatic responses applied thereto, depending on the importance of the policy.

While the simplest approach is to enforce all security policies against all applications, more flexibility may be desired depending on various factors, in terms of number or restrictiveness of applied policies, response to any particular policy failure, or both. For example, an unknown party may have far more policies applied, and/or may be outright refused installation due to failure to fulfill all requirements of these policies, on the grounds that the platform operator has not determined whether they are malicious entities; a long-established and trustworthy party may, in contrast, be given much more leeway. Additionally, it may be understood that some kinds of applications have the potential for more or less harm than others.

Systems have therefore been developed to apply policies in a more selective and granular manner. However, this flexibility typically comes at a cost of configuration time and effort.

SUMMARY

It is an object of the disclosed system and method to apply security and other policies during cloud application deployment in a selective manner.

It is another object of the disclosed system and method to reduce the time, effort, and likelihood of error in configuring the selective application of policies, through improved automation of aspects of the configuration process.

It is yet another object of the disclosed system and method to achieve this improved automation in cooperation with existing systems.

In accordance with certain embodiments of the present disclosure, a method is provided for automated management of policies related to deployment of applications to an application platform. The method includes establishing a plurality of policies each to define a requirement and an automated response. The method further includes establishing a plurality of application groups each defined according to an rule to determine whether an application is contained in the application group. The method further includes establishing a plurality of policy groups each according to a set of included policies and a set of assigned application groups. Each policy in the set of included policies is selected from the plurality of policies, and each application group in the set of assigned application groups is selected from the plurality of application groups. The establishing of each policy group includes automatically generating, by a processor, a configuration file for the policy group associating each application group in the set of assigned application groups with each policy in the set of included policies. The method further includes automatically configuring the application platform, by a processor, according to the configuration file for each of the plurality of policy groups. According to the resulting configuration of the application platform, an admission controller of the application platform selectively tests an application designated for deployment to the application platform, based on containment of the application within an application group, to determine whether it meets the requirement of each policy associated with the application group in the configuration file, and selectively executes the automated response for a policy based on a failure of the application to fulfill the requirement upon testing.

In accordance with other embodiments of the present disclosure, a non-transitory computer-readable recording medium is provided. The recording medium has recorded thereon instructions executable by at least one processor to perform a method for automated management of policies related to deployment of applications to an application platform. The method includes establishing a plurality of policies each to define a requirement and an automated response. The method further includes establishing a plurality of application groups each defined according to an rule to determine whether an application is contained in the application group. The method further includes establishing a plurality of policy groups each according to a set of included policies and a set of assigned application groups. Each policy in the set of included policies is selected from the plurality of policies, and each application group in the set of assigned application groups is selected from the plurality of application groups. The establishing of each policy group includes automatically generating, by a processor, a configuration file for the policy group associating each application group in the set of assigned application groups with each policy in the set of included policies. The method further includes automatically configuring the application platform, by a processor, according to the configuration file for each of the plurality of policy groups. According to the resulting configuration of the application platform, an admission controller of the application platform selectively tests an application designated for deployment to the application platform, based on containment of the application within an application group, to determine whether it meets the requirement of each policy associated with the application group in the configuration file, and selectively executes the automated response for a policy based on a failure of the application to fulfill the requirement upon testing.

In accordance with still other embodiments of the present disclosure, a system is provided for automated management of policies related to deployment of applications to an application platform. The system includes at least one communication module configured to transmit and receive a signal. The system includes at least one memory configured to store computer program code. The system includes at least one processor operatively connected to the communication module and the memory. The processor is configured to operate as instructed by the computer program code. The computer program code includes policy code configured to cause the processor to establish a plurality of policies each to define a requirement and an automated response. The computer program code further includes application group code configured to cause the processor to establish a plurality of application groups each defined according to an rule to determine whether an application is contained in the application group. The computer program code further includes configuration code configured to cause the processor to automatically configure the application platform according to the configuration file for each of the plurality of policy groups. According to the resulting configuration of the application platform, an admission controller of the application platform selectively tests an application designated for deployment to the application platform, based on containment of the application within an application group, to determine whether it meets the requirement of each policy associated with the application group in the configuration file, and selectively executes the automated response for a policy based on a failure of the application to fulfill the requirement upon testing.

Additional aspects, details, and advantages of the disclosed system and method will be set forth, in part, in the description and figures which follow.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As noted in the Background, it is preferable, when preparing an application designated for deployment to a cloud platform, to test the application against a set of policies. In particular, security policies are important to the safety of the system as a whole, the other applications deployed in the system, and the users of the applications. For convenience, the configuration specifically of security policies, and a security admission process executed according to the configuration, will in places be assumed in this disclosure. However, it is noted that configuration of other kinds of policies which can be enforced to limit or monitor the deployment of applications on a platform is within the scope of the claims.

A security admission process is preferably performed following authentication of a party seeking to upload the application, and general authorization of that party to upload an application of the type specified. Suitable processes for authentication and authorization are well-known in the art and fully implemented as part of a variety of cloud platforms, one example being the Resource Create, Read, Update and Delete request for a Kubernetes™ platform, and therefore will not be detailed herein.

Requirements to be tested during a security policy process can generally include, though are not limited to: applications running with elevated privileges, validation of trusted endpoints to download software (such as operating system images), application compliance with Center for Internet Security Kubernetes (CIS k8s) benchmarks, restriction of low level OS function calls (e.g., Linux kernel calls), and any other suitable requirements.

The response to a particular policy may vary depending according to a balance of importance of the policy—(e.g. how much harm an application that fails to meet this policy can do—with its restrictiveness—e.g. how beneficial is it for an application to have the ability to bypass this policy if necessary. Typical responses can include, though are not limited to:

a warning to the uploading party that the particular policy has been violated, with or without an opportunity to cancel deployment;

a notation in a log that the particular policy has been violated by the application, such that the application can be later reviewed in an audit; and/or automatic refusal of deployment of the application.

During design and implementation of a policy, the appropriate automated response can be included in the configuration data for the policy, alongside the requirements to be met. For convenience, such inclusion of the response will be assumed, although those of skill in the art will recognize that the two elements can be associated with each other in some other suitable manner.

As such, a security policy can be thought of as including or defining at least two elements: a requirement or standard against which an application is to be automatically tested, and an automated response to be executed when an application fails to fulfill the requirement upon testing. Preferably, a processor of the application platform operates both the testing and the automated response.

As noted in the Background, it may be preferable to test a policy against some applications or types of applications, but not against others. This can be implemented by defining a third element of each policy: a list or set of groups of applications against which the requirement of the policy will be tested. This list can be included in the configuration data directly, or associated with the appropriate policies in some other suitable manner known in the art.

Each application group is defined according to a rule identifying whether a given application is contained in the group. This can be the party that is uploading the application; a quality or nature of the application such as its size, programming language, or listed functions; a particular identifying feature of the application, such as a vendor identifier included in the code or configuration thereof; or a reference to an explicit list which is kept updated with new individual applications, among other suitable approaches.

Alternatively, a list of application groups can be implemented against which the requirement of the policy will not be tested. One approach or the other may be more preferable, depending on whether it is more likely that a random application about to be deployed will or will not be tested according to a random policy.

Furthermore, it is possible to implement both approaches, such that each policy is provided with either an associated list of application groups to test (for brevity, an "inclusion group list") or an associated list of application groups not to test (for brevity, an "exception group list"), and the system responds appropriately depending on which list is present.

It is noted that it may also be desirable to apply the same requirement to two or more groups of applications, but vary the response depending on the specific group. A simple implementation of this is to define two policies with the same requirement but different responses, and associate the application groups appropriately. Other suitable configuration processes can also be imagined by those of skill in the art and are within the scope of the claims. However, for convenience, the establishment of multiple policies in such cases will be assumed going forward.

Some of the above functionality has been implemented, for example, by the Open Policy Agent (OPA) system, the specifications of which are incorporated herein by reference.

The OPA system is limited, however, in that each individual policy must list all relevant application groups (as noted above, either all groups that are to be tested, or all groups that are not to be tested). Therefore, when a new application group is added to the configuration data, it must be included in the application group list for each of a non-trivial percentage of the policies. As the number of total policies for a cloud platform implementation can number in the hundreds or even thousands, this process is lengthy and tedious, and also prone to error: for example, adding a group to a list where it does not belong, or failing to add the group to a list where it does belong.

In particular, a common division of applications is by vendor, according to their trustworthiness. When such is part of an implementation, the system might need to be reconfigured whenever a vendor is newly added to the system, with a new application group representing that vendor. Additionally, the process must be effectively repeated when that same vendor changes in trustworthiness, both adding the associated application group to some policies and removing the group from others.

A possible solution is to combine policies together into sets of defined policy groups. A single list of application groups can then be associated with every policy in a policy group, and any new application group can be assigned to a policy group at the time it is first generated. However, systems and methods for implementing the policy groups, for associating the appropriate list with each group, and for updating the list as each group will understand it, are required.

The policy groups can, in one solution, be hard-coded into the system. A hard-coded method is used, for example, by Pod Security Standards (PSS). In PSS, the policies are grouped into three categories: baseline, restricted, privileged. PSS also hardcodes the individual policy definitions that goes into these groups.

However, policy groups in hard-coded systems lack customization and therefore do not cater to the requirements of every organization. For example, when the application groups are divided according to vendor, a set of policy groups according to trustworthiness can be predefined. Such an implementation may include: a maximum trustworthiness group, encompassing only the most vital requirements (or none at all), or applying less restrictive responses to all but those requirements; a minimum trustworthiness group, encompassing all requirements and refusing deployment on violation of any of them; and a baseline or default trustworthiness group, encompassing some middle ground between the other two. In some embodiments, new and unfamiliar vendors can be placed in the minimum trustworthiness group, new but well-known vendors can be placed in the baseline group, and close partners can be placed in the maximum trustworthiness group.

In another example, when the application groups are divided according to application function or type, a set of policy groups defined according to necessary safety can be predefined. A group of applications which can be particular harmful to a user, such as those that collect financial data or other sensitive information, can be assigned to a high security policy group having the most policies with the strongest responses; relatively harmless applications such as free media services can be assigned to a low security policy group having only a few policies; and the remainder can be assigned to one or more mid-level security policy groups.

A hard-coded approach limits flexibility. A better solution, therefore, is to permit on-the-spot establishment and incorporation of new policy groups according to the needs of the platform.

This preferred solution permits, for example, an implementation where at least one of the policy groups is associated one-to-one with a particular application group, and tailored to the needs of that application group. For example, when the vendor is the same party as the party implementing the platform itself, this may warrant that no application in the group is refused deployment outright, and only the most crucial policy violations are logged for later review and audit. Other vendors who have proven themselves through close partnership may also have their own specially-defined group, or all such vendors may be placed in a "partner" group. Alternatively, specialized policy groups may take into account both vendor and application type. Many other purposes for specific policy groups can be easily imagined, demonstrating the advantages of a flexible policy group implementation.

Certain embodiments of this preferred solution will be now described in detail.

Figure 1:
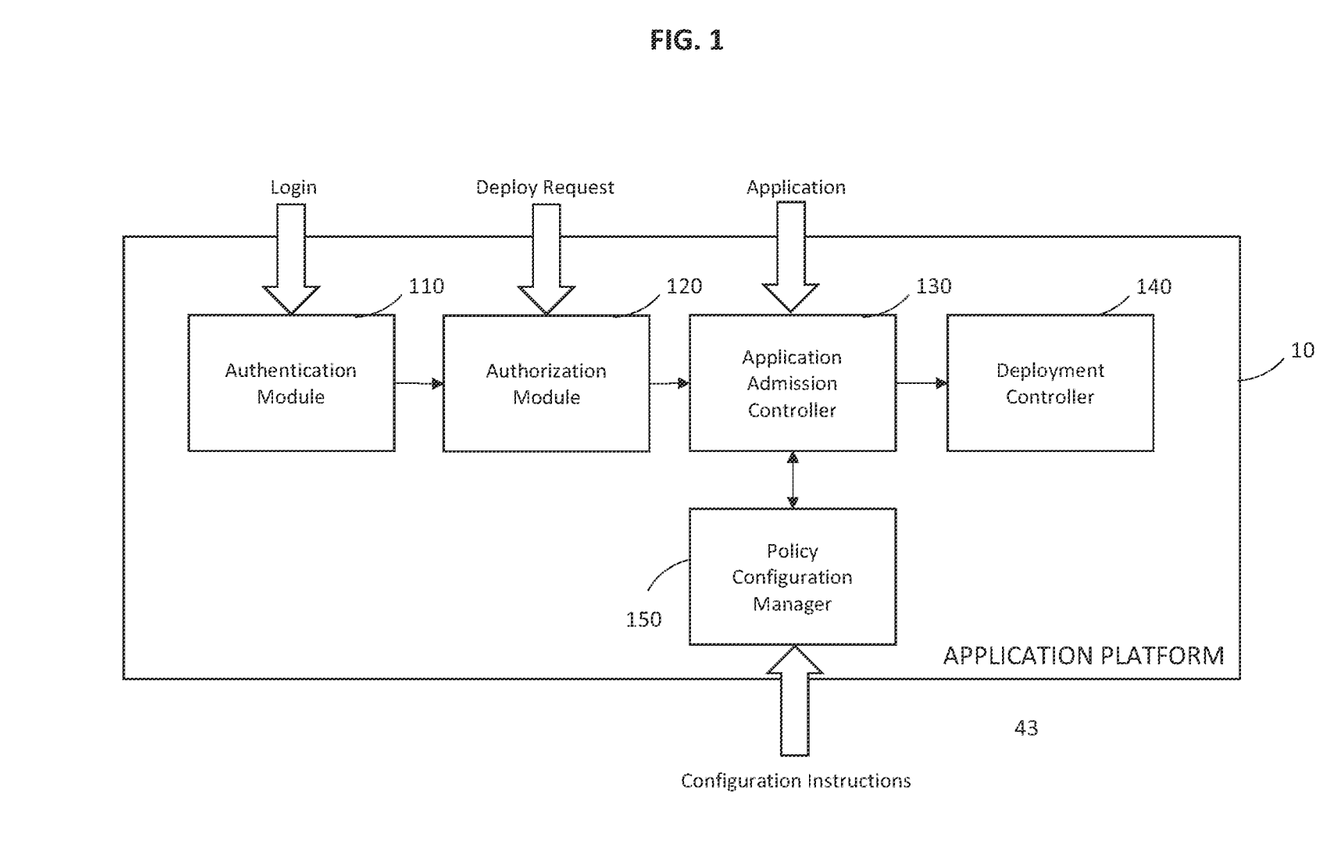
FIG. 1 is a schematic diagram illustrating an application platform including a system for automated configuration of policies therein, in accordance with an exemplary embodiment.

FIG. 1 illustrates an application platform including a system for automated configuration of policies therein, according to an example embodiment.

An application platform 10 may be implemented on a plurality of servers, each having at least one processor, at least one non-volatile memory configured to store computer program code which is executed on the processor, and at least one communication module configured to transmit and receive a signal. The servers are communicatively coupled to each other through their respective communication modules over a network, such as the Internet. It is noted that, due to the nature of cloud computing, any one of these servers may operate according to computer program code in order to operate the processes and components described herein. Indeed, there may be no one server permanently handling any given operation, but such operations can be transferred from server to server.

According to an example embodiment, the application platform 10 includes an authentication module 110, an authorization module 120, an application admission controller 130, and a deployment controller 140.

The authentication module 110 receives a login request (including login credentials) from a user or party, and authenticates the user's login credentials to provide access to the system. If the user then requests to upload and deploy an application onto the platform, the request is received and processed by the authorization module 120, which determines whether the user has permission to do so, and optionally limits the types of applications that a particular user may deploy. If the user is authorized to upload and deploy an application, the application is received as a data object for review by the application admission controller 130.

The application admission controller 130 reviews the application according to its configuration. This review can include one or more tests which are selectively applied according to features of the application and/or the user that requested its deployment. If the application fails a test, the application admission controller 130 selectively executes one of several possible automated responses according to the test and the configuration of the controller 130.

If the application does not fail any of the selectively applied tests, or the application admission controller 130 otherwise does not execute an automated response which cancels deployment of the application, the application is transferred to the deployment controller 140, which manages the deployment of the application through the servers of the platform 10.

According to an example embodiment, the application platform 10 additionally includes a policy configuration manager 150. The policy configuration manager 150 manages security or other policies, as well as application groups to apply those policies to, according to the instruction of an administrator, and configures the application admission controller 130 to provide the tests and automated responses in accordance with these policies.

Some operations of the policy configuration manager 150 will now be described.

Figure 2A:
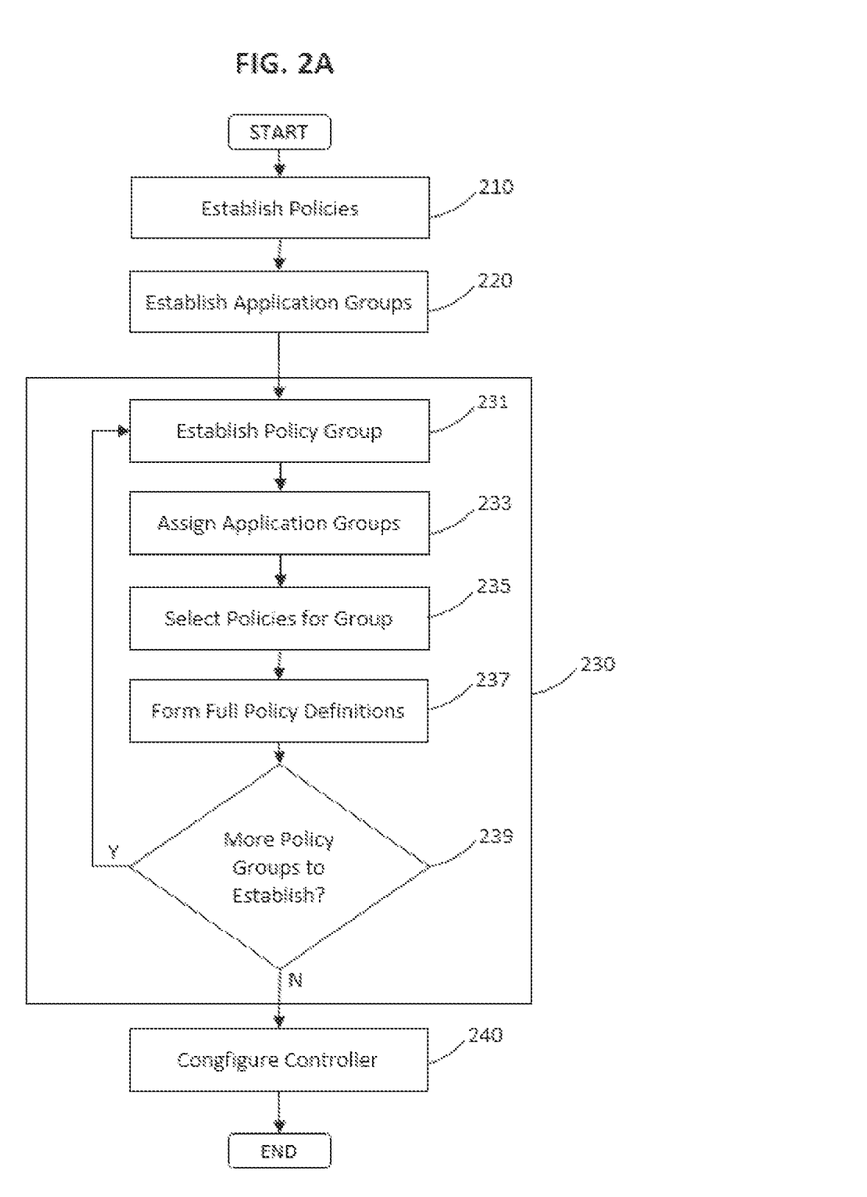
FIG. 2A is a flow diagram illustrating a flow of processes for initial configuration of security policies in an application platform, in accordance with an exemplary embodiment.

FIG. 2A illustrates a method for initial configuration of security policies in an application platform, according to an example embodiment. It is noted that security policies are provided as an example, and the systems and methods described in this disclosure may be modified to consider other types of policies.

At 210, a plurality of security policies are established and partially defined. The partial definition of each security policy includes definitions of a requirement and an automated response. Certain exemplary requirements and responses have been previously described, although the scope is not limited thereto.

A list of application groups will be included in the full definition of each security policy, but is not in the partial definition. A null value or other placeholder may be substituted for the list of application groups in certain implementations.

At 220, a plurality of application groups are established and defined. Each application group is defined according to a rule which determines whether a particular application is contained in that application group. Certain exemplary rules have been previously described, although the scope is not limited thereto. It may be convenient also to designate the policy groups to which each application group will be added at this time, although this can also occur as part of operation 233, as will be discussed below.

At 230, a plurality of policy groups are established and defined.

More specifically, at 231, a new policy group is established and preferably provided a name or other suitable identifier.

At 233, a set of application groups from the plurality of application groups are assigned to the policy group and a list of these assigned application groups is prepared. Additionally or alternatively, a list of application groups not assigned to the policy group may be prepared.

At 235, a set of policies for the policy group are selected, and the partial definitions for each of these policies are retrieved.

At 237, the set of application groups are added to or associated with each partial definition to form a full definition of each policy, as applicable to the policy group. The full definitions are combined to generate a full definition for the policy group as a whole. Alternatively, the partial definitions can be combined to generate a partial definition for the policy group as a whole, at 235, and the set of application groups can then be added to each policy within this partial definition.

At 239, it is determined whether more policy groups should be established. If it is determined that more policy groups should be established ("Yes" at 239), the workflow returns to 231. Otherwise ("No" at 239), the workflow continues to 240.

It is noted that, after multiple iterations of operations 231-239, there may be multiple versions of full definitions of some security policies, each assigned to a different policy group and each including the list of application groups in that policy group as part of the definition. That is to say, these security policies correspond in included requirement and response, but differ in included group list.

At 240, the established security groups are applied to the configuration of the system (e.g., configuration of the application admission controller 130) to be automatically applied to any uploaded application. More specifically, the security policies which were fully defined during the iterations of 230 are preferably implemented such that, for any application identified by a particular application group, the system (e.g., application admission controller 130) will test any security policy that includes that application group in its group inclusion list (or omits it from its group exclusion list, as applicable) against that application. Preferably, the full definitions are also independently stored for later retrieval.

Figure 2B:
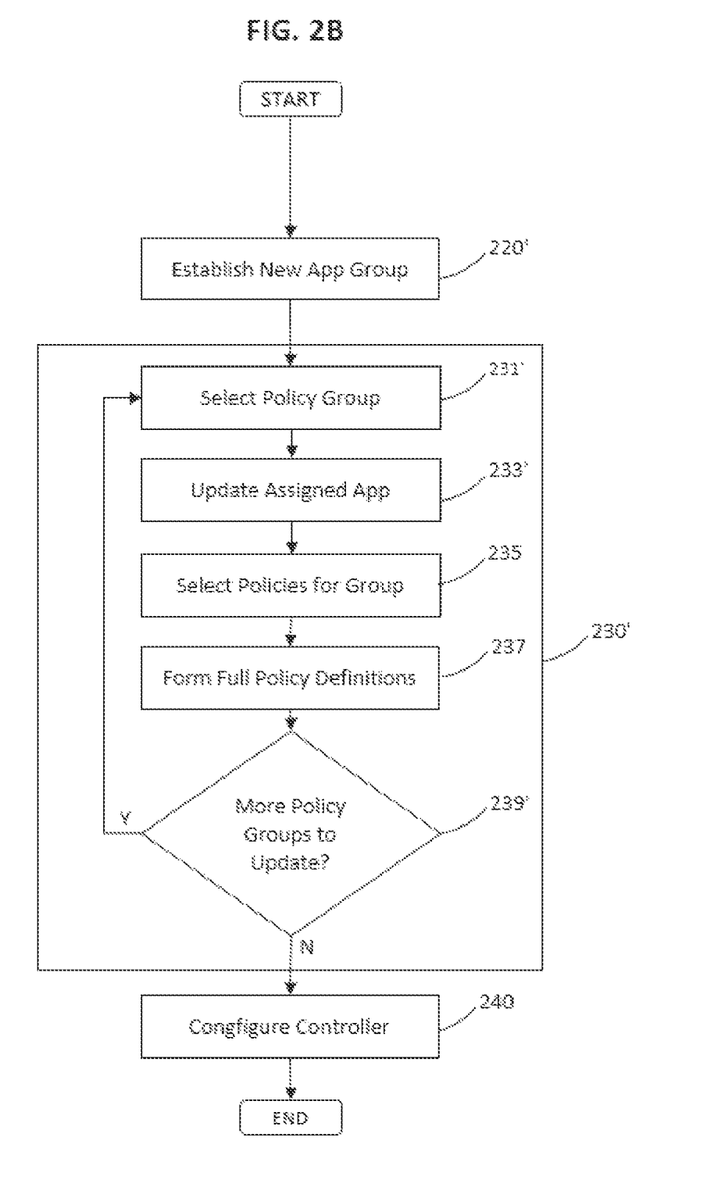
FIG. 2B is a flow diagram illustrating a flow of processes for updating configuration of security policies in an application platform responsive to the addition of a new application group, in accordance with an exemplary embodiment.

It is likely that new application groups will sometimes need to be added to the system, and the security policies will need to be updated accordingly. FIG. 2B illustrates a method to update the configuration of security policies in an application platform responsive to the addition of a new application group, according to an example embodiment.

At 220', the new application group is established and defined, largely in the same manner as in operation 220 in the method of FIG. 2A. Preferably, the policy groups to which the new application group will be added are designated at this time.

At 230', the policy groups are updated. More specifically, at 231', a policy group to which the new application group will be added is selected. At 233', the list of application groups assigned to the policy group is updated to add the new application group. Operations 235 and S37 are performed as in the method of FIG. 2A, using the existing set of policies and the updated application group list. At 239', it is determined whether more policy groups are to be updated. If so, the workflow returns to 231'. Otherwise, the workflow continues to 240.

Operation 240 is then performed as in the method of FIG. 2A, using the security policies which were updated during the iterations of 230'. It may also be necessary to recall from storage the security policies which were not updated, depending on the specific nature of the execution of operation 240 and whether it requires a inclusion of all policy definitions together.

Following operation 240, the security policies as applied to the configuration of the application admission controller 130 are updated to reflect the addition of the new application group.

For brevity, an implementation using an exclusion list rather than an inclusion list, or combinations thereof, will not be detailed herein, but those of skill in the art will be able to extrapolate such implementations.

It is noted that the only manual administrator operation required in the method of FIG. 2B is operation 220', which is a simple matter of (1) defining the rule identifying applications in the new application group, and (2) designating the policy groups to which the new application group will be added. All operations following can be completely automated, greatly reducing human time and effort as well as the risk of data entry errors.

It is also noted that the addition of a new policy group is a trivial matter of executing a single iteration of operations 233-237 as described in FIG. 2A, for the new policy group, followed by operation 240. In this process, the only required manual administrator operation is to designate the security policies and application groups which will be associated with the new policy group. Addition of individual application groups to individual security policies is automated as before.

Although not limited thereto, an example embodiment exploits the existing functionality of Open Policy Agent (OPA), briefly described earlier and incorporated herein. OPA serves as an interface between the policy configuration manager 150 and the application admission controller 130 of the application platform 10; the policy configuration manager 150 generates the instructions which OPA uses to configure the application admission controller 130.

As relevant to this embodiment, OPA defines the complete set of security policies for a controller configuration in a single definition file, with suitable separators between policies. An example OPA policy definition, within a definition file to be implemented on a Kubernetes platform, is as follows:

```
apiVersion: constraints.gatekeept.sh/v1beta1
kind: PSPAllowedUsers
metadata:
    name: pods-run-as-nonroot
spec:
    enforcementAction: deny
    match:
        kinds:
        -           apiGroups: [""]
                    kinds ["pod"]
        namespaces: ["app-1", "app-2", "app-3"]
    parameters:
        runAsUser:
                    rule: MustRunAsNonRoot
```

According to OPA's preferred terminology, an application group is known as a "namespace." The OPA policy definition includes a "namespaces" parameter which defines the list of application groups to which the defined policy will be applied.

Once a OPA policy definition file is properly completed, OPA is programmed to configure a controller to apply the policies as defined to any uploaded application—that is to say, OPA is programmed to execute operation 240, as described above.

Mindful of this, the operations of FIG. 2A can be implemented as follows:

Operation 210 establishes a template for each security policy, which includes the partial definition—that is, the requirement and the automated response. The templates may be implemented and manipulated using any suitable templating engines and tools (e.g., Jinja, Django, etc.)

According to OPA's terminology, the requirement is a policy action which needs to be specified under in the parameter of the OPA policy definition. The policy action may be defined according to one of multiple enforcement levels, such as "warn," "audit," or "deny" ("deny" in the example below) and the application group list may be either an inclusion list (labeled "namespaces" in the example below) or an exclusion list (labeled "excludedNamespaces" in the example below). As such, an example policy template, which can be used to generate the definition file entry example described earlier, can be prepared as follows:

```
apiVersion: constraints.gatekeepr.sh/v1beta1
kind: PSPAllowedUsers
metadata:
   name: pods-run-as-nonroot
spec:
   enforcementAction: deny
   match:
      kinds:
      -          apiGroups: [""]
                 kinds ["pod"]
      namespaces: ""
      excludedNamespaces: ""
   parameters:
      runAsUser:
                         rule: MustRunAsNonRoot
```

A "null" placeholder is included for the namespaces parameter, which will be filled in later operations. Additionally, the example template above has a feature of being able to define either an inclusion list (in the "namespaces" parameter) or an exclusion list (in the "excludedNamespaces" parameter) depending on which is provided during operation 237.

Operations 220 and 231 establish the required data through any suitable data entry and storage process.

Operation 233 establishes a configuration file defining a list of application groups for the relevant policy group. Again, when using OPA's preferred terminology, the term "namespaces" is used to describe a list of application groups. This configuration file can be therefore formatted as follows:

```
<policy group name>:
   namespaces: <app group name>, <app group name>, <app group name>
```

The list of application groups can alternatively be labeled to indicate that they form an exclusion list instead of an inclusion list (as one example, when using OPA, the application group list can be labelled as "excludedNamespaces").

It is possible to include multiple policy groups in a single configuration file, in advance of operation 233, such that operation 233 itself is a trivial matter of retrieving the portion of the configuration file labeled with the appropriate policy group name.

Operation 235 combines the individual templates of the policies in the policy group (established in operation 210) into a single template for the entire policy group. In some implementations, the policy group templates themselves are prepared manually at operation 210, such that operation 235 is a trivial matter of retrieving the appropriate template. However, it is preferable to automate the combination process for each policy group, such that a policy in multiple policy groups will be identical between groups without risk of data entry error.

Operation 237 retrieves the application group(s) (defined in the "namespaces" or "excludedNamespaces" fields) from the configuration file for the policy group, and inserts it in place of the null value for each policy in the policy group template. This can be accomplished by any suitable data insertion technique (e.g., utilizing a Python script, etc.)

Using the above approach, an example embodiment may be implemented using OPA interacting with a Kubernetes platform. It is noted that this is but one example implementation, and those of skill in the art will be able to extrapolate from the principles described herein to use other systems which have the functionality to process a manually-prepared configuration file for defining security policies, or indeed any policies.

These and related processes, and other necessary instructions, are preferably encoded as executable instructions on one or more non-transitory computer readable media, such as hard disc drives or optical discs, and executed using one or more computer processors, in concert with an operating system or other suitable measures. More specifically, and as previously noted, the method described above can be programmed as executable software instructions to be stored and executed on one or more of the master nodes of the cluster, or alternatively on a separate computing device for managing node configuration.

In a software implementation, the software includes a plurality of computer executable instructions, to be implemented on a computer system. Prior to loading in a computer system, the software preferably resides as encoded information on a suitable non-transitory computer-readable tangible medium, such as magnetically, optically, or other suitably encoded or recorded media. Specific media can include but are not limited to magnetic floppy disks, magnetic tapes, CD-ROMs, DVD-ROMs, solid-state disks, or flash memory devices, and in certain embodiments take the form of pre-existing data storage (such as "cloud storage") accessible through an operably coupled network means (such as the Internet).

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 3:
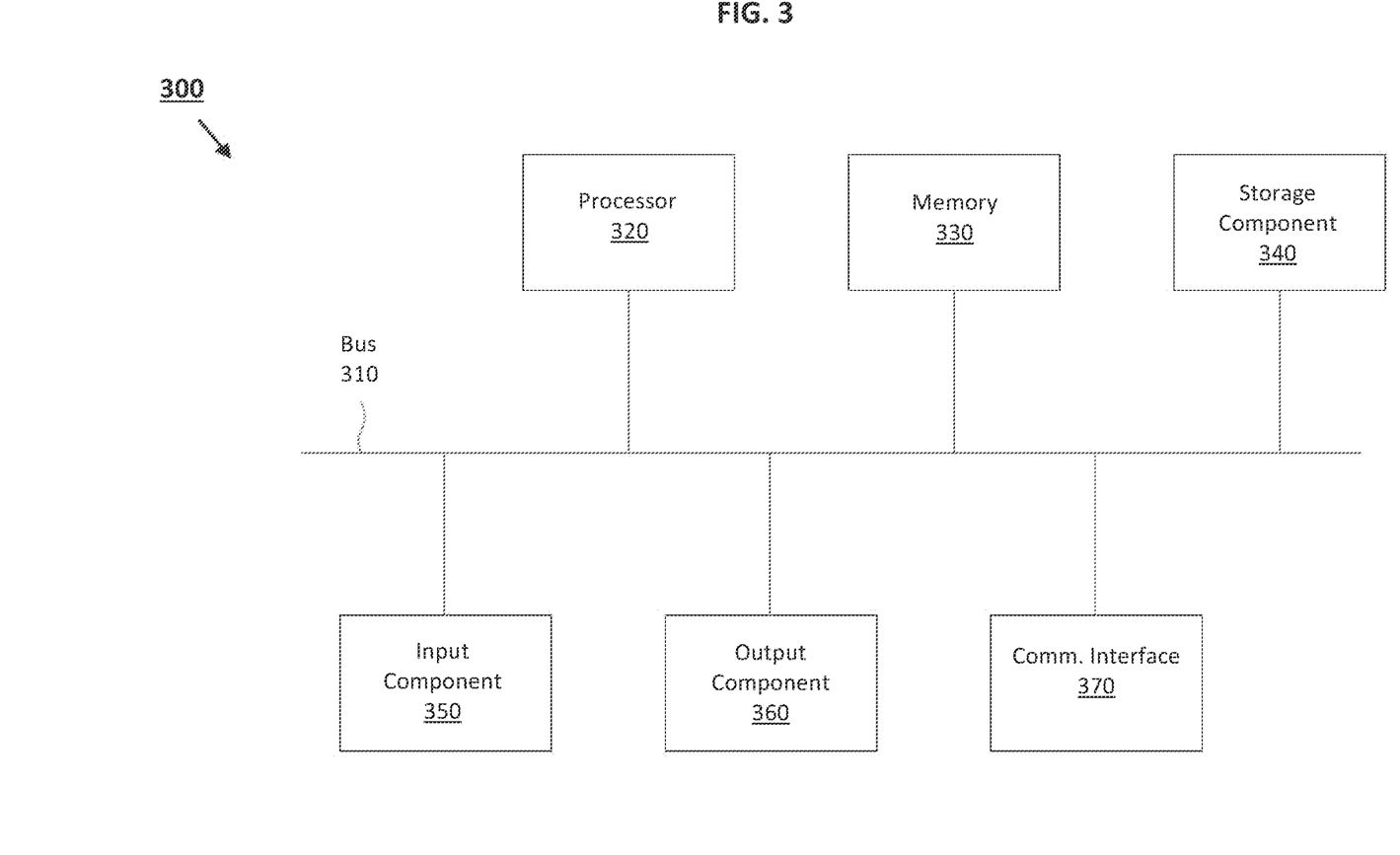
FIG. 3 is a block diagram illustrating an exemplary computer system for programmatic and/or hardware implementation of various embodiments.

FIG. 3 is a diagram of components of one or more devices according to an embodiment. Device 300 may correspond to any computing device described above (such as any server of the application platform 10), as well as to a processor executing any described software module (such as components 110-150) or method (such as those illustrated in FIGS. 2A and 2B), and to a memory containing any described data storage.

As shown in FIG. 3, the device 300 may include a bus 310, a processor 320, a memory 330, a storage component 340, an input component 350, an output component 360, and a communication interface 370. It is understood that one or more of the components may be omitted and/or one or more additional components may be included.

The bus 310 includes a component that permits communication among the components of the device 300. The processor 320 is implemented in hardware, firmware, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 320 includes one or more processors capable of being programmed to perform a function.

The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300.

For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). The input component 350 may include a sensor for sensing information (e.g., a global positioning system (GPS) component, an accelerometer, a gyroscope, and/or an actuator).

The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform operations based on the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or storage component 340 may cause the processor 320 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for automated management of policies related to deployment of applications to an application platform, the method comprising:

establishing a plurality of policies each to define a requirement and an automated response;
establishing a plurality of application groups each defined according to a rule to determine whether an application is contained in the application group;
establishing a plurality of policy groups each according to a set of included policies and a set of assigned application groups, each policy in the set of included policies being selected from the plurality of policies, each application group in the set of assigned application groups being selected from the plurality of application groups, the establishing of each policy group including automatically generating a configuration file for the policy group associating each application group in the set of assigned application groups with each policy in the set of included policies; and
automatically configuring the application platform according to the configuration file for each of the plurality of policy groups, such that an admission controller of the application platform:
 selectively tests an application designated for deployment to the application platform, based on containment of the application within an application group, to determine whether it meets the requirement of each policy associated with the application group in the configuration file, and
 selectively executes the automated response for a policy based on a failure of the application to fulfill the requirement upon testing,
wherein the generating the configuration file includes:
 establishing a template collectively defining the requirement and the automated response for each of the policies of the policy group; and
 inserting a list of the application groups in the set of assigned application groups into the template in association with each of the policies of the policy group, and
wherein the automated response is one of a plurality of automated responses according to the selectively applied tests.

2. The method of claim 1, wherein the template is established by combining policy templates respectively predefined for each of the policies of the policy group.

3. The method of claim 1, further comprising:
adding an application group to the plurality of application groups;
revising the configuration file for at least one selected policy group to associate the added application group with each policy in the set of included policies of the selected policy group; and
automatically re-configuring the application platform according to the revised configuration file for the policy group.

4. A non-transitory computer-readable recording medium having recorded thereon instructions executable by at least one processor to perform a method for automated management of policies related to deployment of applications to an application platform, the method comprising:
establishing a plurality of policies each to define a requirement and an automated response;
establishing a plurality of application groups each defined according to a rule to determine whether an application is contained in the application group;
establishing a plurality of policy groups each according to a set of included policies and a set of assigned application groups, each policy in the set of included policies being selected from the plurality of policies, each application group in the set of assigned application groups being selected from the plurality of application groups, the establishing of each policy group including automatically generating a configuration file for the policy group associating each application group in the set of assigned application groups with each policy in the set of included policies; and automatically configuring the application platform, by a processor, according to the configuration file for each of the plurality of policy groups, such that an admission controller of the application platform:

selectively tests an application designated for deployment to the application platform, based on containment of the application within an application group, to determine whether it meets the requirement of each policy associated with the application group in the configuration file, and selectively executes the automated response for a policy based on a failure of the application to fulfill the requirement upon testing, wherein the generating the configuration file includes:

establishing a template collectively defining the requirement and the automated response for each of the policies of the policy group; and inserting a list of the application groups in the set of assigned application groups into the template in association with each of the policies of the policy group, and wherein the automated response is one of a plurality of automated responses according to the selectively applied tests.

5. The recording medium of claim 4, wherein the template is established by combining policy templates respectively predefined for each of the policies of the policy group.

6. The recording medium of claim 4, wherein the method further includes:

adding an application group to the plurality of application groups;

revising the configuration file for at least one selected policy group to associate the added application group with each policy in the set of included policies of the selected policy group; and automatically re-configuring the application platform according to the revised configuration file for the policy group.

7. A system for automated management of policies related to deployment of applications to an application platform, the system comprising:

at least one communication module configured to transmit and receive a signal;

at least one memory configured to store computer program code; and at least one processor operatively connected to the communication module and the memory, the processor being configured to operate as instructed by the computer program code, the computer program code including:

policy code configured to cause the processor to establish a plurality of policies each to define a requirement and an automated response;

application group code configured to cause the processor to establish a plurality of application groups each defined according to a rule to determine whether an application is contained in the application group;

policy group code configured to cause the processor to establish a plurality of policy groups each according to a set of included policies and a set of assigned application groups, each policy in the set of included policies being selected from the plurality of policies, each application group in the set of assigned application groups being selected from the plurality of application groups, the establishing of each policy group including automatically generating a configuration file for the policy group associating each application group in the set of assigned application groups with each policy in the set of included policies; and configuration code configured to cause the processor to automatically configure the application platform according to the configuration file for each of the plurality of policy groups, such that an admission controller of the application platform:

selectively tests an application designated for deployment to the application platform, based on containment of the application within an application group, to determine whether it meets the requirement of each policy associated with the application group in the configuration file, and selectively executes the automated response for a policy based on a failure of the application to fulfill the requirement upon testing, wherein the generating the configuration file includes:

establishing a template collectively defining the requirement and the automated response for each of the policies of the policy group; and inserting a list of the application groups in the set of assigned application groups into the template in association with each of the policies of the policy group, and wherein the automated response is one of a plurality of automated responses according to the selectively applied tests.

8. The system of claim 7, wherein the template is established by combining policy templates respectively predefined for each of the policies of the policy group.

9. The system of claim 7, wherein:

the application group code is further configured to cause the processor to add an application group to the plurality of application groups;

the policy group code is further configured to cause the processor to revise the configuration file for at least one selected policy group to associate the added application group with each policy in the set of included policies of the selected policy group; and the policy group code is further configured to cause the processor to automatically re-configure the application platform according to the revised configuration file for the policy group.

* * * * *